G. C. ROBINSON.
CIRCUIT CLOSER FOR AUTOMOBILE SIGNALS.
APPLICATION FILED NOV. 15, 1916.
1,307,927.
Patented June 24, 1919.
2 SHEETS—SHEET 2.
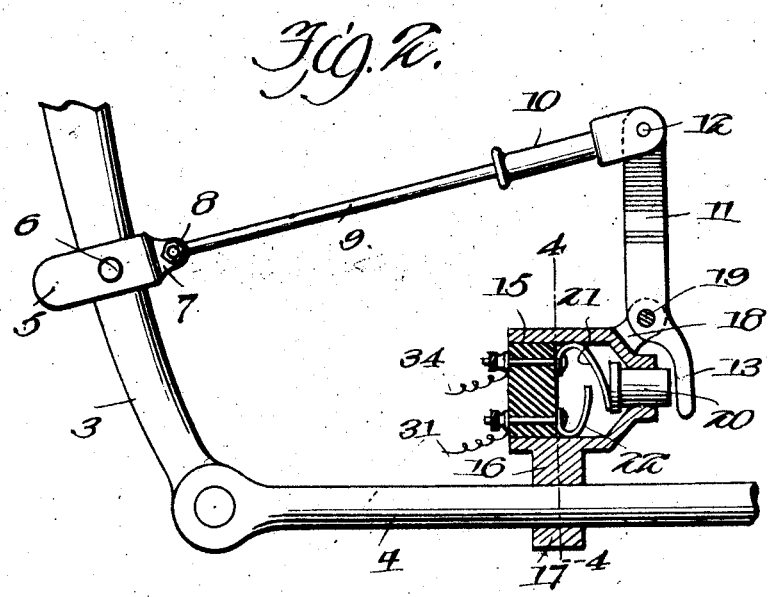
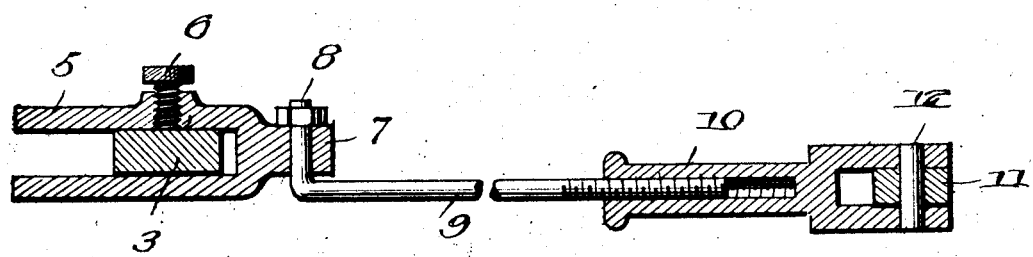
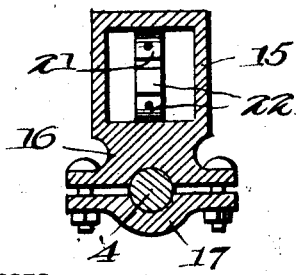
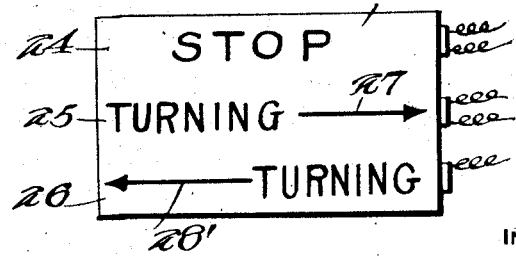
INVENTOR,
G. C. Robinson,
BY Victor J. Evans
ATTORNEY

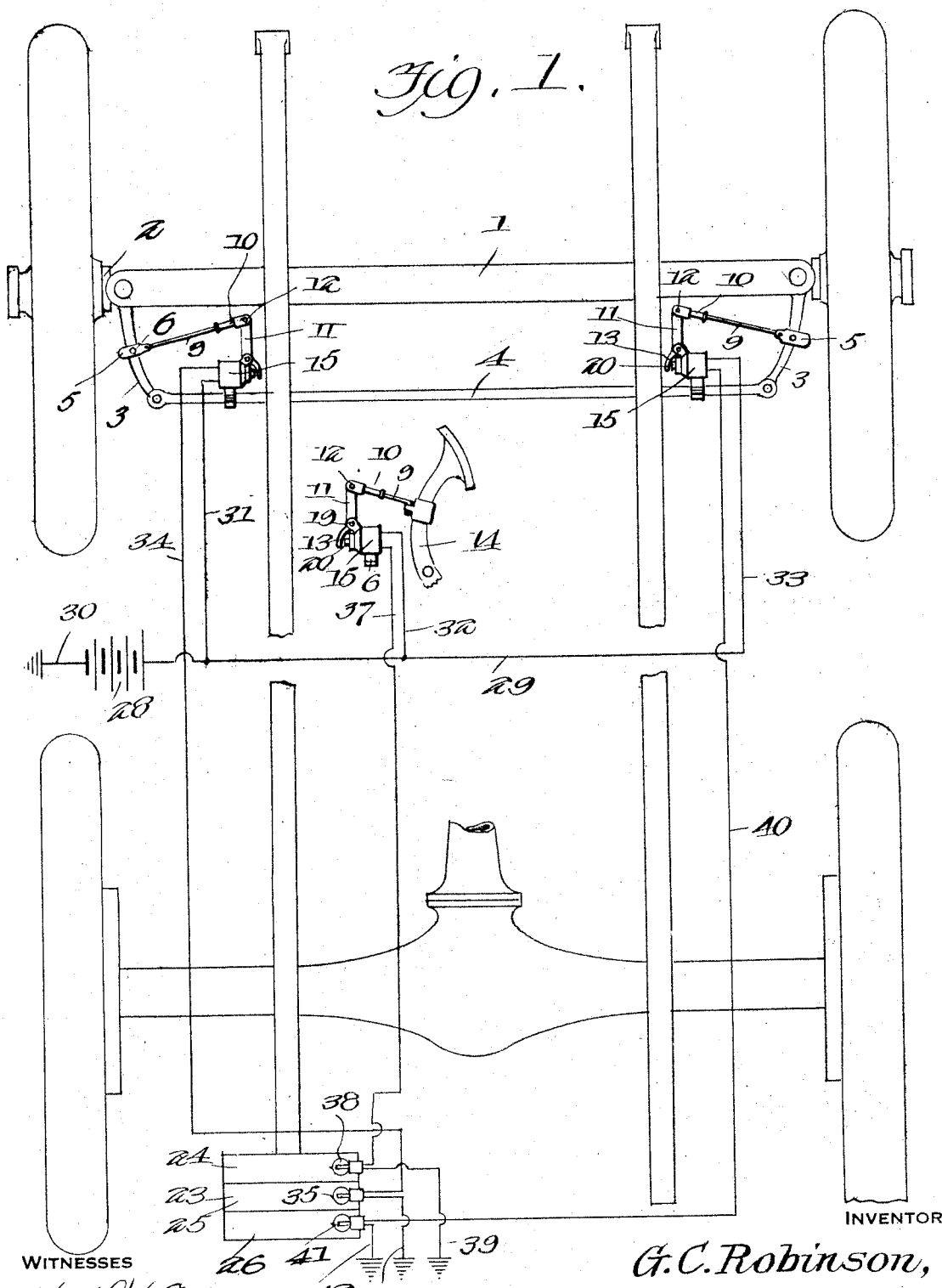

UNITED STATES PATENT OFFICE.

GIRARD C. ROBINSON, OF DETROIT, MICHIGAN.

CIRCUIT-CLOSER FOR AUTOMOBILE-SIGNALS.

1,307,927.   Specification of Letters Patent.   Patented June 24, 1919.

Application filed November 15, 1916.   Serial No. 131,524.

*To all whom it may concern:*

Be it known that I, GIRARD C. ROBINSON, a citizen of the United States, residing at Detroit, in the county of Wayne and State of Michigan, have invented new and useful Improvements in Circuit-Closers for Automobile-Signals, of which the following is a specification.

The present invention relates to a circuit closer for a signal for automobiles or like self-propelled vehicles.

In carrying out my invention it is my purpose to produce a signal which will automatically operate when the clutch or steering apparatus is actuated so as to signal to the rear of the machine the direction of course that the said machine is to take or when the machine is to be brought to a stop, so that pedestrians or vehicles to the rear of the machine will be properly warned with respect to the intentions of the driver of the machine so that accidents from rear-end collisions may be thus effectively obviated.

It is a further object of the invention to produce a device of this character which shall be of a simple construction, which may be readily and easily attached to any ordinary construction of motor vehicles, which, when so attached will require no further attention and which shall be positively automatic in its operation.

With the above and other objects in view the improvement resides in the construction, combination and arrangement of parts set forth in the following specification and falling within the scope of the appended claim.

In the drawings:

Figure 1 is a diagrammatic view illustrating the arrangement of the improvement upon the chassis of a motor vehicle, Fig. 2 is a part sectional view upon a greatly enlarged scale showing the circuit closing means, Fig. 3 is a part sectional view of the means for connecting the closer to a movable part of the automobile.

Fig. 4 is a sectional view approximately on the line 4—4 of Fig. 2, and

Fig. 5 is a view of the rear signal box.

In the drawings the numeral 1 designates the front axle of any ordinary construction of automobiles, 2 the spindles pivotally connected with the axle, 3 the spindle arms and 4 the spindle connecting rod.

To each of the spindle arms 3 I connect a clip 5. Each of the clips preferably comprises a member that is centrally bifurcated from one of its ends and the spindle arm 3 is received in the said bifurcation. One of the sides of the clip 5 is formed with an outwardly extending enlargement or boss that is provided with a central threaded opening communicating with the slot or bifurcation and which is designed to receive a set screw 6 that contacts with one of the sides of each of the spindle arms and retains the clip upon the said arm. The end of the clip, opposite that provided with the slot or bifurcation is formed with an eye 7 which is adapted to receive the bent end 8 of a rod member 9. Each of the rods 9 has a threaded end whereby to engage in the threaded socket provided upon a sleeve 10, the outer end of each of the said sleeves being widened and slotted to receive therein a link 11, the said link being pivotally connected to the slotted end of the sleeve, as indicated by the numerals 12. Each of the links has its free end provided with a reduced portion forming a finger 13 and the purpose of which will presently be described. In addition to arranging the mechanism above described upon the spindle arms 3, I also arrange a similar construction upon the depending arm of the brake lever 14 of the automobile, and as the parts of the device are identical with those previously described, the reference characters indicating the said mentioned parts are equally applicable to those arranged upon the arm of the clutch pedal 14.

The numerals 15 designate switch boxes or casings each being of a similar construction and each being provided with a laterally extending head 16, the opposite ends of which have openings whereby the same may be attached to the machine. The head 16, upon the two switch boxes 15 that are preferably arranged upon the spindle connecting rod 4 are centrally depressed and the spindle rod is received within the said depressions, while removable plates 17 also provided each with a central depression to receive the outer portion of the spindle rod are disposed over the head 16 and are connected thereto by removable elements, such as bolts passing through openings which aline with the openings in the ends of the head, nuts engaging with the said bolt to effectively and adjustably retain the switch box upon the spindle rod. The head 16 of the switch box 15 disposed adjacent to the clutch pedal 14 is not provided with the plate 17, the securing elements passing through the referred to openings adjacent to the opposite ends of the head 16 of the said switch box and this switch box may be connected in any desired or preferred manner to the body of the machine or to the frame therefor.

Each of the switch boxes 15 upon what I will term the outer face thereof and adjacent one of the sides of the same is formed with outwardly extending spaced ears 18 between which are received the links 11, and each of the said links being pivotally connected, as at 19, between one pair of ears upon each of the switch boxes.

The numerals 20 designate push members or buttons of insulated material which pass through openings in the switch box and which are disposed one adjacent each of the fingers 13 of the respective links 11 whereby to be contacted by the said fingers and moved longitudinally by virtue of such contact in a manner and for a purpose which will presently be described. Within each of the switch boxes 15, and insulated therefrom, is arranged a pair of spring switch arms 21 and 22 respectively, the same being normally out of contact, but the spring arm 21 engages with the inner end of the push members 20 to normally project the same a suitable distance outward of the switch boxes.

To the rear of the machine, preferably upon one of the rear fenders therefor, but, of course, adapted to be located at any desired or convenient position, is arranged a casing 23, the same being provided with three distinct compartments indicated for distinction by the numerals 24, 25 and 26. Each of the compartments of the casing 23, upon the outer face thereof, is provided with a transparent plate having indicia thereon relative to the direction of travel of the machine or to indicate when the machine is about to stop. If desired, however, such indicia may be, and preferably is, cut through the outer face of the said casing 23, the indicia for the upper compartment 24 spelling the word "Stop," the letters upon the remaining compartments spelling the word "Turning" and extending in opposite directions from these words are arrows 27 and 28 respectively which are also formed by cutting the outer plate or face of the compartments 25 and 26. The arrow 27 for the compartment 25 has its head pointing in one direction, while the arrow 28' for the compartment 26 has its head pointed in an opposite direction so that drivers of vehicles or pedestrians to the rear of the machine, when any one of the compartments of the casing 23 is lighted in a manner which will presently be described will be readily informed if the machine is to stop or if the machine is to turn around to the right or left.

The numeral 28 designates the battery for the electrically actuated parts of the machine proper, 29 the main wire from the battery, and 30 the return wire which is grounded to the frame of the machine. To the main wire 29 is connected branch line wires 31, 32 and 33 respectively. The wire 31 leads to the switch 21 in the switch box 15 to the left hand side of the drawing, the wire 32 leading to the switch spring 21 in the switch box 15 disposed adjacent to the clutch pedal 14, while the wire 33 connects with the spring switch 21 on the switch box 15 to the right hand side of the drawing. The return wire connected with the switch spring 22 of the first mentioned switch box 15 is indicated by the numeral 34 and is connected with a lamp 35 in the central compartment 25 of the casing 23, the return wire 36 from the said lamp being grounded to the frame of the machine. The return line wire for the spring switch point 22 of the second mentioned switch box 15 is indicated by the numeral 37 and leads to the upper compartment 24 of the casing 23 and connects with the lamp 38 in the said compartment, the return wire 39 from the lamp being grounded to the machine. The wire for the spring switch 22 in the remaining switch box 15 is indicated by the numeral 40 and is connected with a lamp 41 in the lower compartment 26 of the casing 23, the return wire 42 from the lamp being grounded to the frame of the machine.

While I have illustrated two of the switch boxes 15 as being connected to the spindle rod 4, it is obvious that the same may be secured if desired to any other part of the machine. The spindle arms 3, of course, move in unison with the spindle rod 4, but as is well known the path of travel of the spindle rod is greater than that of the spindle arms, and consequently when the machine is to turn, say, to the left, the finger 13 of the link 11 on the right hand side of the drawing will be moved to engage with the push button 20 bringing the spring contacts 21 and 22 in the said box 15 into engagement, and energizing the circuit connected with the lamp 41, thus illuminating the compartment 26. The movement of the spindle rod in one direction will cause the finger 23 of the adjacent link 11 to be brought away from the push member 20 in the switch box 15 upon the left hand side of the frame, and the referred to movement of parts will be reversed when the machine is operated to turn to the right, in which instance, the switch members 21 and 22 will be brought into contacting engagement by the push member 20 actuated by the finger 13 of the lip 11 in the construction on the left hand side of the drawings, and the circuit for the lamp 35 will be energized, so that the central compartment will be illuminated. When the clutch member is operated it will be apparent that the finger 13 of the remaining link 11 will actuate the push member 20 in the remaining switch box closing the circuit for the lamp 38, and thus illuminating the upper compartment 24 of the casing 23.

The construction above described permits of all of the parts being interchangeable and adjustable with relation to the structure upon which they are arranged, and it is thought that the operation and advantages of the device will be apparent without further detailed description.

Having thus described the invention, what I claim is:

A circuit closer for the electrical signal system for automobiles comprising a switch box, a pair of contacts in said box connected with the circuit, a push button in said box engaging one of said contacts, a pair of ears on the box, a link pivoted to the ears and having a finger for operating the button, a sleeve pivotally connected to the link, a rod adjustably connected with said sleeve, a U shaped clip pivoted to the rod and means for adjustably securing the clip to a movable part of the automobile.

In testimony whereof I affix my signature.

GIRARD C. ROBINSON.